United States Patent
Sarkar et al.

(10) Patent No.: US 8,300,597 B1
(45) Date of Patent: Oct. 30, 2012

(54) METHOD AND SYSTEM OF CELL SWITCHING WHILE PING-PONGING

(75) Inventors: Debasish Sarkar, Irvine, CA (US); Sachin R. Vargantwar, Overland Park, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 648 days.

(21) Appl. No.: 12/206,990

(22) Filed: Sep. 9, 2008

(51) Int. Cl.
*H04W 4/00* (2009.01)

(52) U.S. Cl. .................... 370/331; 370/336; 455/436

(58) Field of Classification Search .................... None
See application file for complete search history.

(56) References Cited

U.S. PATENT DOCUMENTS

| | | | |
|---|---|---|---|
| 2003/0142647 A1* | 7/2003 | Agrawal et al. | 370/331 |
| 2005/0070287 A1* | 3/2005 | Cave et al. | 455/436 |
| 2006/0252428 A1 | 11/2006 | Agashe et al. | |
| 2007/0042780 A1 | 2/2007 | Attar et al. | |
| 2007/0042781 A1* | 2/2007 | Yavuz et al. | 455/445 |
| 2007/0155385 A1 | 7/2007 | Balasubramanian et al. | |
| 2007/0242606 A1 | 10/2007 | Chen | |

OTHER PUBLICATIONS

Shuming Guo et al., "A Scheme of Choosing DSCLength in cdma2000 1xEV-DO Rev A," IET International Conference on Wireless Mobile and Multimedia Networks Proceedings p. 392 (ICWMMN 2006).

* cited by examiner

*Primary Examiner* — Jianye Wu (57) ABSTRACT

An access terminal may be operating in a first mode in which it sends DSC transmissions that each indicate a cell in which the access terminal will be requesting data after sending the transmission. The access terminal may then detect that it is located at a boundary between two cells. In response, the access terminal may switch from operating in the first mode to operating in a second mode by reducing a number of timeslots that each DSC transmission occupies and beginning to alternate between sending a DSC transmission indicating the first cell and a DSC transmission indicating the second cell. In turn, the BTSs serving the two cells may receive these DSC transmissions and responsively switch from operating in a first mode to operating in a second mode in which both BTSs continue receiving the access terminal's data (e.g., by suspending the sending of "ForwardStopped" messages to an RNC).

18 Claims, 6 Drawing Sheets

METHOD AND SYSTEM OF CELL SWITCHING WHILE PING-PONGING

BACKGROUND

In a typical cellular radio communication system, an area is divided geographically into a number of wireless coverage areas such as cells and sectors, each defined by a radiation pattern from one or more base station antennae of an access network. As an access terminal moves between coverage areas of the access network, when network conditions change, or for other reasons, the access terminal may switch from receiving service in one coverage area to receiving service in another coverage area. In a usual case, this switching process is triggered by the access terminal monitoring the signal conditions in various available coverage areas of the access network, and the access terminal and/or the access network determining when one or more threshold criteria are met.

In one typical example, the access terminal may monitor signal strength in various available coverage areas and then decide to switch to a new sector when the new sector has a signal strength that is sufficiently higher than the sector in which the access terminal is currently requesting service. The access terminal may then notify the access network of its decision to switch sectors. In turn, the access network may carry out the access terminal's decision to switch sectors by ending service of the access terminal in the current sector and beginning service of the access terminal in the new sector. While this arrangement generally works well to facilitate seamless service of the access terminal as it moves between wireless coverage areas, delays may occur during the switching process, impacting throughput. Accordingly, a more efficient process for an access terminal to switch between coverage areas is desired.

OVERVIEW

Disclosed herein is a method of operation of an access terminal in an access network. Throughout the method, the access terminal may be sending to the access network, on a first reverse-link channel (e.g., a data rate control (DRC) channel), transmissions that each indicate a coverage area in which the access terminal is currently requesting data. The access terminal may be operating in a first mode in which the access terminal sends to the access network, on a second reverse-link channel (e.g., a data source control (DSC) channel), transmissions that each occupy a first number of timeslots and that each indicate a coverage area in which the access terminal will be requesting data after sending the transmission.

The access terminal may then detect that it is located at a boundary between a first and second coverage area. In response, the access terminal may switch from operating in the first mode to operating in a second mode by (a) reducing a number of timeslots that each transmission on the second reverse-link channel occupies from a first number to a second number and then (b) beginning to alternate between sending to the access network on the second reverse-link channel a transmission that indicates the first coverage area and sending to the access network on the second reverse-link channel a transmission that indicates the second coverage area, with each transmission on the second reverse-link channel occupying the second number of timeslots. In this respect, the transmissions on the second reverse-link channel may serve as a notification to the access network that the access terminal is located at the boundary.

Also disclosed herein is a method of operation of a base transceiver station (BTS) in an access network, where the BTS is capable of transmitting data to an access terminal in a first coverage area. Throughout the method, the BTS may be receiving from the access terminal, on a first reverse-link channel (e.g., a DRC channel), transmissions that each indicate a coverage area in which the access terminal is currently requesting data. The BTS may also be receiving from the access terminal, on a second reverse-link channel (e.g., a DSC channel), a first type of transmissions that each occupy a first number of timeslots and that each indicate a coverage area in which the access terminal will be requesting data after sending the transmission. In response to receiving the first type of transmissions, the BTS may be operating in a first mode in which the BTS stops receiving data destined for the access terminal in response to (a) receiving from the access terminal, on the first reverse-link channel, one or more transmissions that do not indicate the first coverage area and (b) receiving from the access terminal, on the second reverse-link channel, one or more transmissions that do not indicate the first coverage area. For example, the BTS may stop receiving the data destined for the access terminal by sending a "Forward-Stopped" message to a radio network controller (RNC), so that the RNC would stop sending the data to the BTS.

The BTS may then detect that it is receiving from the access terminal, on the second reverse-link channel, a second type of transmissions that indicate the access terminal is located at a boundary between the first coverage area and a second coverage area. In response, the BTS may then switch from operating in the first mode to operating in a second mode in which the BTS continues receiving data destined for the access terminal even when (a) receiving from the access terminal, on the first reverse-link channel, one or more transmissions that do not indicate the first coverage area and (b) receiving from the access terminal, on the second reverse-link channel, one or more transmissions that do not indicate the first coverage area. For example, the BTS may continue receiving the data destined for the access terminal by suspending the sending of "ForwardStopped" messages to the RNC.

In one example, the second type of transmissions on the second reverse-link channel may take the form of transmissions that each occupy a second number of timeslots that is less than the first number of timeslots, and that each indicate whichever of the first coverage area and the second coverage area that a preceding transmission did not indicate.

These as well as other aspects and advantages will become apparent to those of ordinary skill in the art by reading the following detailed description, with reference where appropriate to the accompanying drawings.

DETAILED DESCRIPTION

Figure 1:
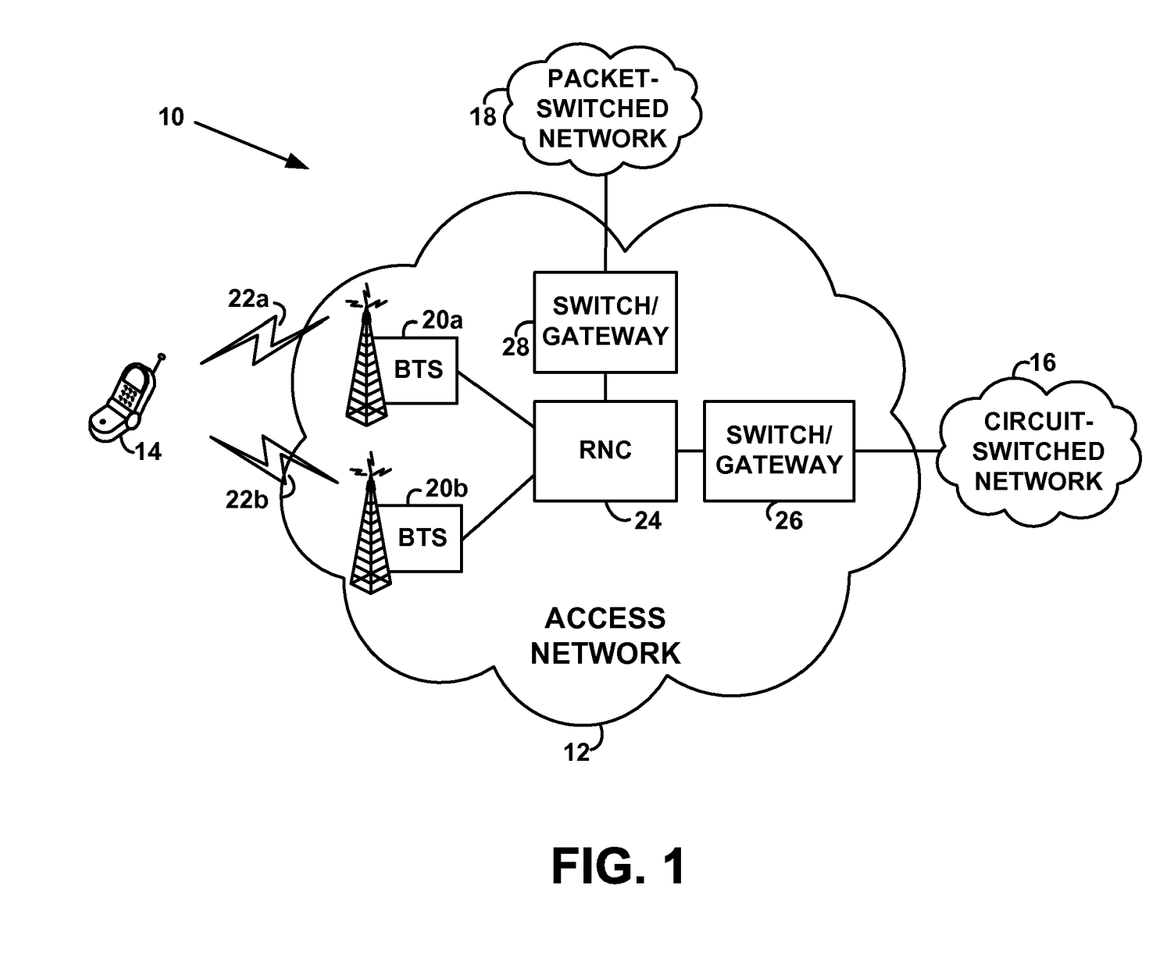
FIG. 1 is a simplified block diagram of a communication system in which an exemplary method can be implemented.

Referring to the drawings, FIG. 1 is a simplified block diagram of a communications system 10 in which an exemplary method can be implemented. As shown, the system 10 includes an access network 12, which may function to provide connectivity between an access terminal 14, such as a cell phone, PDA, or other wirelessly-equipped device, and one or more transport networks, such as a circuit-switched network 16 (e.g., the public switched telephone network (PSTN)) or a packet-switched network (e.g., the Internet) 18.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, the access network 12 may include a plurality of base transceiver stations (BTSs) 20, such as a first BTS 20a and a second BTS 20b. (Although FIG. 1 depicts the access network 12 as including two BTSs, it should be understood that the access network 12 may include more than two BTSs). The BTSs 20 may each be any entity that facilitates communication between an access terminal 14 and the access network 12. In this respect, the BTSs 20 may each function to transmit RF-radiation patterns at one or more carrier frequencies, and the RF-radiation patterns may then provide one or more air interfaces 22 over which an access terminal 14 may communicate with the access network 12. For example, each BTS 20 may transmit omni-directional RF-radiation patterns that provide a single air interface 22. Alternatively, each BTS 20 may transmit directional RF-radiation patterns that provide multiple air interfaces 22.

Each of the one or more air interfaces 22 of a given BTS 20, such as the first BTS 20a, may define a corresponding wireless coverage area of the first BTS 20a. For example, if the first BTS 20a provides a single air interface 22, then the first BTS 20a may serve a single wireless coverage area (e.g., a cell). Alternatively, if the first BTS 20a provides multiple air interfaces 22, the first BTS 20a may serve multiple wireless coverage areas (e.g., sectors). For purposes of illustration, the following description will assume the first BTS 20a serves access terminals 14 in a first coverage area (i.e., a first cell) and the second BTS 20a serves access terminals 14 in a second coverage area (i.e., a second cell). Further, each of the first and second cells may include one or more sectors.

The air interfaces 22 of the BTSs 20 may carry communications between the access network 12 and the access terminal 14 according to any of a variety of protocols. For example, the air interfaces 22 may carry communications according to CDMA (e.g., 1xRTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces 22 may also be divided into a plurality of channels for carrying different types of communications between the access terminal 14 and the access network 12. For example, each air interface 22 may include forward-link channels (e.g., control channels, forward-traffic channels, etc.) for carrying forward-link communications from the access network 12 to the access terminal 14, as well as reverse-link channels (e.g., access channels, reverse-traffic channels, etc.) for carrying reverse-link communications from the access terminal 14 to the access network 12. In a preferred example, the access terminal 14 will communicate with the access network 12 according to an IS-856 protocol (e.g., Evolution-Data Optimized (EV-DO)), such as IS-856 Rel. 0 or IS-856 Rev. A.

Each BTS 20 of the access network 12 may then couple to a radio network controller (RNC) 24, which may function to communicate with each BTS 20 and control aspects of the BTSs 20 as well as aspects of the air-interface communication with the access terminal 14. (Although FIG. 1 depicts the access network 12 as including one RNC 24, it should be understood that the access network 12 may include more than one RNC 24, in which case each RNC 24 may couple to a subset of the BTSs 20 in the access network 12. Further, although the BTSs 20 and the RNC 24 are depicted as separate entities, it should be understood that the RNC 24 and one or more BTSs 20 may be incorporated into a single entity). For example, the RNC 24 may control assignment of air-interface traffic channels to the access terminal 14. As another example, the RNC 24 may control aspects of the access terminal 14 switching between sectors and/or cells of the access network 12. As yet another example, the RNC 24 may facilitate communication between BTSs 20 of the access network 12, such as communication between the first BTS 20a and the second BTS 20b. Other examples are possible as well.

The RNC 24 may then couple to a switch/gateway 26, such as a mobile switching center (MSC), which may provide connectivity with the circuit-switched network 16. Further, the RNC 24 may couple to a switch/gateway 28, such as a packet data serving node (PDSN), which may provide connectivity with the packet-switched network 18. In this respect, the RNC 24 may additionally include a packet control function (PCF) for controlling packet-data communications. Accordingly, with this general arrangement, the access network 12 may facilitate communications between two access terminals 14 in the access network 12, as well as communications between a given access terminal 14 in the access network 12 and a communication device on the circuit-switched network 16 and/or the packet-switched network 18.

At any one time, an access terminal 14 may request and receive service from the access network 12 in a single "serving" coverage area (and thus from a single serving BTS), which the access terminal 14 selects from the access network's plurality of coverage areas. To facilitate this selection process, the access terminal 14 may monitor signal conditions (e.g., carrier-to-interference (C/I) ratio and/or a signal-to-interference-plus-noise ratio (SINR)) for a plurality of coverage areas detected by the access terminal 14. The access terminal 14 will then typically select, request, and receive service in the coverage area with the best signal conditions (i.e., the "strongest" coverage area). Thereafter, when the signal conditions detected by the access terminal 14 change such that there is a new "strongest" coverage area (e.g., when the access terminal 14 moves locations), the access terminal 14 may decide to switch its selection of serving coverage area. In this respect, the access terminal 14 may notify the access network 12 of its decision to switch to a new coverage area. In turn, the access network 12 may function to "hand off" service of the access terminal 14 from the prior coverage area to the new coverage area.

The process of the access terminal 14 notifying the access network 12 of a coverage area switch and the access network 12 responsively handing off service to the new coverage area may occur in a variety of ways. In one example, an IS-856 access terminal 14 may use a first reverse-link channel, known as a "data rate control" (DRC) channel, to notify the access network 12 of a coverage area switch.

Typically, an IS-856 access terminal 14 uses the reverse-link DRC channel to indicate to the access network 12 the coverage area in which the access terminal 14 is currently requesting data. In particular, the access terminal 14 may send the access network 12 DRC-channel transmissions that each indicate a sector, and thus a cell, in which the access terminal 14 is currently requesting data. Every DRC-channel transmission consists of a specific number of consecutive IS-856 DRC messages, each occupying a single DRC channel timeslot, and thus every DRC-channel transmission occupies the specific number of DRC-channel timeslots (i.e., an access terminal 14 must send DRC messages in multiples of the specific number). In IS-856, the specific number is a system parameter known as "DRCLength," and may have a value of four as an example. Each IS-856 DRC message of a given DRC-channel transmission may include (i) a "DRC Cover," which specifies the sector in which the access terminal 14 is currently requesting data, and (ii) a "DRC Rate," which specifies the data rate requested by the access terminal 14 in the selected sector. In IS-856, every DRC message of a given DRC-channel transmission must have the same DRC cover and DRC rate. As such, a current IS-856 access terminal 14 can only change its DRC Cover and/or DRC Rate after sending every DRC message of a given DRC-channel transmission (i.e., an access terminal 14 may only change its DRC Cover and/or DRC Rate every DRCLength consecutive DRC messages).

As noted above, the access terminal 14 may use the reverse-link DRC channel to notify the access network 12 of a sector switch. For example, in response to deciding to switch from a first sector to a second sector, the access terminal 14 requesting data in the first sector may simultaneously notify the access network 12 of the sector switch and begin requesting data in the second sector by sending the access network 12 one or more DRC-channel transmissions that indicate the second sector. In response to receiving the one or more DRC-channel transmissions that indicate the second sector, the access network 12 may then stop sending data to the access terminal 14 in the first sector and begin sending data to the access terminal 14 in the second sector.

If the first sector and the second sector are in different cells and served by different BTSs 20, however, the BTS 20 in the new cell may first need to prepare to serve the access terminal 14 in the second sector. For example, after receiving the first DRC-channel transmission indicating the second sector, the BTS 20 in the new cell may need to request, receive, and queue a sufficient amount of data destined for the access terminal 14 before the BTS 20 can begin sending data to the access terminal 14. Thus, when the access terminal 14 uses the DRC channel to notify the access network 12 of a coverage area switch, and specifically a cell switch, an undesirable delay may occur between the time the access terminal 14 notifies the access network 12 of the switch and the time the BTS 20 can begin serving the access terminal 14. To reduce this delay, an IS-856 access terminal 14 may now use a second reverse-link channel, known as a "data source control" (DSC) channel, to provide the access network 12 with advance notification of switch to a new cell, thus allowing the access network 12 to prepare to serve the access terminal 14 in the new cell while continuing to serve the access terminal 14 in the current cell.

Typically, an IS-856 access terminal 14 uses the reverse-link DSC channel to indicate to the access network 12 the data source from which the access terminal 14 wishes to receive data. In particular, the access terminal 14 may send the access network DSC-transmissions that each indicate a cell in which the access terminal 14 will be requesting data after the transmission. (It should be understood that because DRC-channel transmissions and DSC-channel transmissions occupy different channels, the access terminal 14 may send, and the access network 12 may thus receive, DRC-channel transmissions and DSC-channel transmissions substantially simultaneously). Every DSC-channel transmission consists of a specific number of consecutive IS-856 DSC messages, each occupying a single DSC-channel timeslot, and thus every DSC-channel transmission occupies the specific number of DSC-channel timeslots (i.e., an access terminal 14 must send DSC messages in multiples of the specific number). In IS-856, the specific number is a system parameter known as "DSCLength," and may have a value of sixty-four as an example. Preferably, the DSCLength value is selected such that a BTS 20 in a new cell has sufficient time to prepare to serve the access terminal 14. Each DSC message of a given DSC-channel transmission may then include a "DSC cover," which specifies the cell in which the access terminal 12 will be requesting data after the given DSC-channel transmission. In IS-856, every DSC message of a given DSC-channel transmission must have the same DSC cover. As such, a current IS-856 access terminal 14 can only change its DSC Cover after sending every DSC message in a given DSC-channel transmission (i.e., an access terminal 14 may only change its DSC cover every DSCLength consecutive DSC messages).

The access terminal 14 may use the DSC channel to provide the access network 12 with advance notification of a cell switch. For example, in response to deciding to switch from a first sector in a first cell to a second sector in a second cell, an access terminal 14 requesting data in the first sector of the first cell may notify the access network 12 of the cell switch by sending a first DSC-channel transmission that indicates the second cell. While sending the first DSC-channel transmission that indicates the second cell, the access terminal 14 may also continue sending, and the access network 12 may thus continue receiving, DRC-channel transmissions that indicate the first sector of the first cell. As such, the access terminal 14 may continue receiving data in the first sector of the first cell while the BTS 20 of the second cell prepares to serve access terminal 14. Once the access terminal 14 has finished sending the first DSC-channel transmission that indicates the second cell (i.e., after DSCLength timeslots), the access terminal 14 may then begin requesting data in the second cell by sending one or more DRC-channel transmissions that indicate that second cell, and more particularly the second sector. Assuming the DSCLength value provides the second cell's BTS 20 sufficient time to prepare to serve the access terminal 14, the second cell's BTS 20 may then begin sending data to the access terminal 14 in the second sector without any significant delay. As such, the access terminal's use of the DSC channel to provide the access network 12 with advance notification of a cell switch may minimize the time period during which the access terminal 14 is not receiving data from the access network 12, and may thus improve the overall rate at which the access terminal 14 receives data from the access network 12.

When an IS-856 access terminal 14 decides to switch from a first cell to a "stronger" second cell, however, the access terminal 14 must still wait a predefined period of time—typically DSCLength timeslots—before the access terminal 14 can begin requesting data in the "stronger" cell. During this time, the access terminal 14 may still be requesting and receiving data from the access network 12 in the first cell, but at a lower data rate than it could otherwise request and receive in the "stronger" cell. As such, current switching processes may result in a lower overall rate at which the access terminal 14 receives data from the access network 12. This is especially the case when the access terminal 14 is switching back and forth between two cells (i.e., "ping-ponging"), such as when is located at a boundary between those cells. In this scenario, the access terminal 14 may detect a change in the "strongest" cell multiple times during DSCLength timeslots, but the access terminal 14 may only switch cells every DSCLength timeslots, thus increasing the likelihood that the access terminal 14 is receiving data from the access network 12 at a lower rate than it could otherwise receive. Accordingly, a more efficient process for an access terminal 14 to switch between coverage areas is desired.

Figure 2:
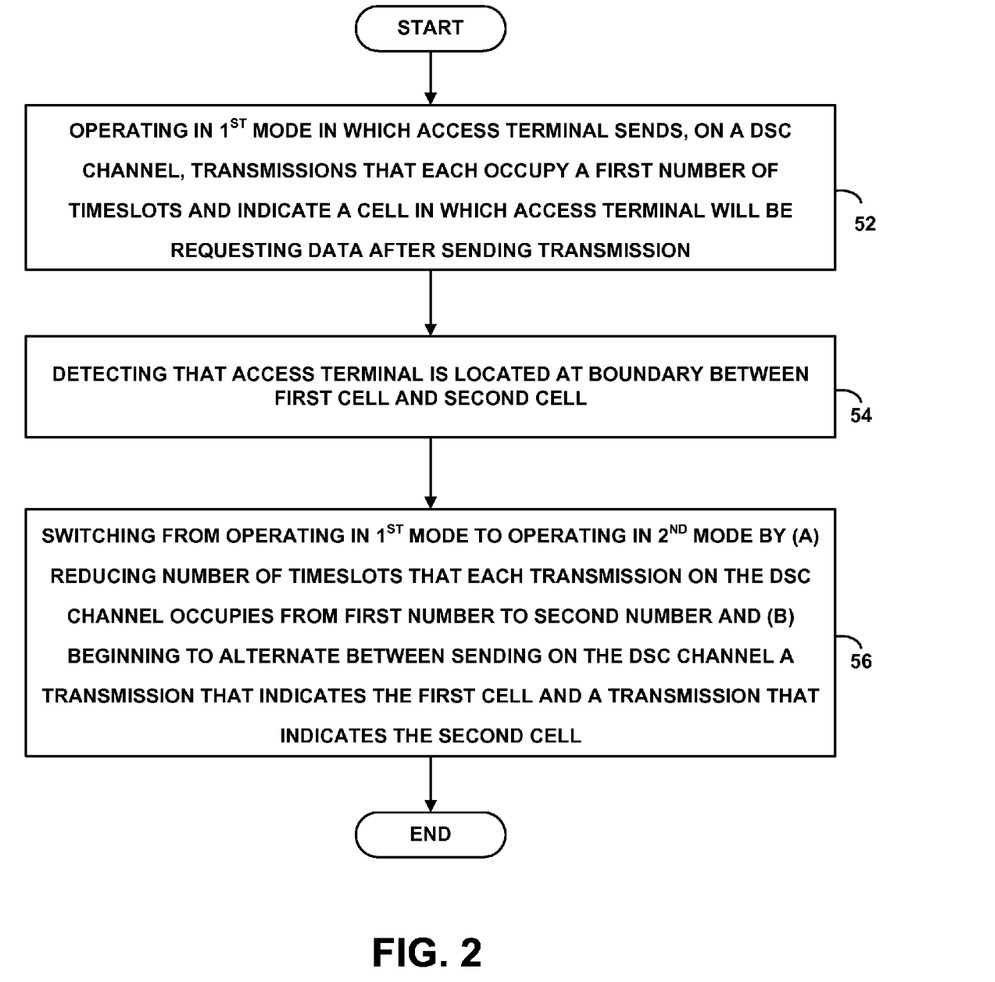
FIG. 2 is a flow chart depicting an exemplary method of operation of an access terminal in an access network.

FIG. 2 is a flow chart depicting an exemplary method of operation of an access terminal 14 in the access network 12. Throughout the exemplary method, the access terminal 14 may be sending to the access network 12, on a first reverse-link channel, transmissions that each indicate a cell in which the access terminal is currently requesting data. Preferably, the first reverse-link channel will be a DRC channel. In this respect, each transmission on the DRC channel will preferably occupy DRCLength timeslots and consist of DRCLength consecutive IS-856 DSC messages. As a result of sending on the first reverse-link channel one or more transmissions that indicate a given cell, the access terminal 14 may also receive data from the access network 12 in the given cell.

At step 52, the access terminal 14 may be operating in a first mode. While operating in the first mode, the access terminal 14 may be sending to the access network 12, on a second reverse-link channel, transmissions that each occupy a first number of timeslots and that each indicate a cell in which the access terminal 12 will be requesting data after sending the transmission. Preferably, the second reverse-link channel will be a DSC channel. In this respect, the first number will preferably be DSCLength, such that each transmission on the DSC channel occupies DSCLength timeslots of the DSC channel and consists of DSCLength consecutive IS-856 DSC messages. After sending on the second reverse-link channel a transmission that indicates a particular cell, the access terminal 14 may be able to request and receive data from the access network 12 in the particular cell.

At step 54, the access terminal 14 may then detect that it is located at a boundary between a first cell and a second cell of the access network 12. For example, the access terminal 14 may detect that it is located at the boundary by determining that it has switched between requesting data in the first cell and requesting data in the second cell a threshold number of times during a given time period. The threshold number of times and the given time period may both be configurable parameters (e.g., the threshold number of switches may be 5 and the given time period may be 10 seconds). According to this example, the access terminal 14 may maintain or have access to historical data indicating the cells (and/or sectors) in which the access terminal 14 has previously requested data, along with associated time periods.

As another example, the access terminal 14 may detect that it is located at the boundary by (a) determining a given signal condition (e.g., C/I or SINR) of both the first cell (and/or a sector thereof) and the second cell (and/or a sector thereof), and (b) determining that a difference between the given signal condition of the first cell and the given signal condition of the second cell is less than a predefined threshold for a given period of time, both of which are configurable parameters (e.g., the predefined threshold for C/I may be 3 dB and the given time period may be 10 seconds). In this respect, the access terminal 14 may determine the signal conditions of the first and second cells (and/or the sectors thereof) based on pilot signal measurements.

As yet another example, the access terminal 14 may detect that it is located at the boundary by determining that a location of the access terminal is less than a predefined distance from a location of the boundary between the first cell and the second cell, where the predefined distance is a configurable parameter. In this respect, the access terminal 14 may determine its location using any technology now known or later developed, including satellite-based methods (e.g., GPS). Further, the access terminal 14 may maintain or have access to data defining the access network's cells and the boundaries thereof, as well as a predefined distance parameters associated with the boundaries. Other examples for detecting that the access terminal is located at the boundary between the first and second cells may exist as well.

At step 56, in response to detecting that is located at the boundary between the first and second cells, the access terminal 14 may switch from operating in the first mode to operating in the second mode. In switching from operating in the first mode to operating in the second mode, the access terminal 14 may change a type of transmissions that it sends on the second reverse-link channel. In this respect, the access terminal 14 may temporarily stop using the second reverse-link channel to indicate the cell in which the access terminal 12 will be requesting data after sending a transmission on the second reverse-link channel, and may instead use the second reverse-link channel to notify the access network 12 that the access terminal 14 is located at the boundary between the first cell and the second cell. Upon receiving this notification, the access network 12 may then prepare to serve the access terminal 14 in either cell, thus enabling the access terminal 14 to request and receive data from the access network 12 in either cell without any significant delay.

In particular, in switching from operating in the first mode to operating in the second mode, the access terminal 14 may first reduce a number of timeslots that each transmission on the second reverse-link channel occupies from the first number to a second number. As described above, the first number will preferably be DSCLength. The second number will then preferably be a configurable parameter that is less than DSCLength. In this respect, the second number may be selected to balance a desire to quickly notify the access network 12 that the access terminal 14 is located at the boundary with a desire to ensure that the access network 12 receives enough timeslots of each transmission to decode and process the transmission. In one example, the second number will be four.

After reducing the number of timeslots that each transmission on the second reverse-link channel occupies, the access terminal 14 may then begin alternating between (a) sending to the access network 12 on the second reverse-link channel a transmission that occupies the second number of timeslots and indicates the first cell and (b) sending to the access network 12 on the second reverse-link channel a transmission that occupies the second number of timeslots and indicates the second cell. These reduced-timeslot transmissions that alternate between indicating the first cell and the second cell may then serve as a notification to the access network 12 that the access terminal 14 is located at the boundary between the first cell and the second cell.

Figure 3:
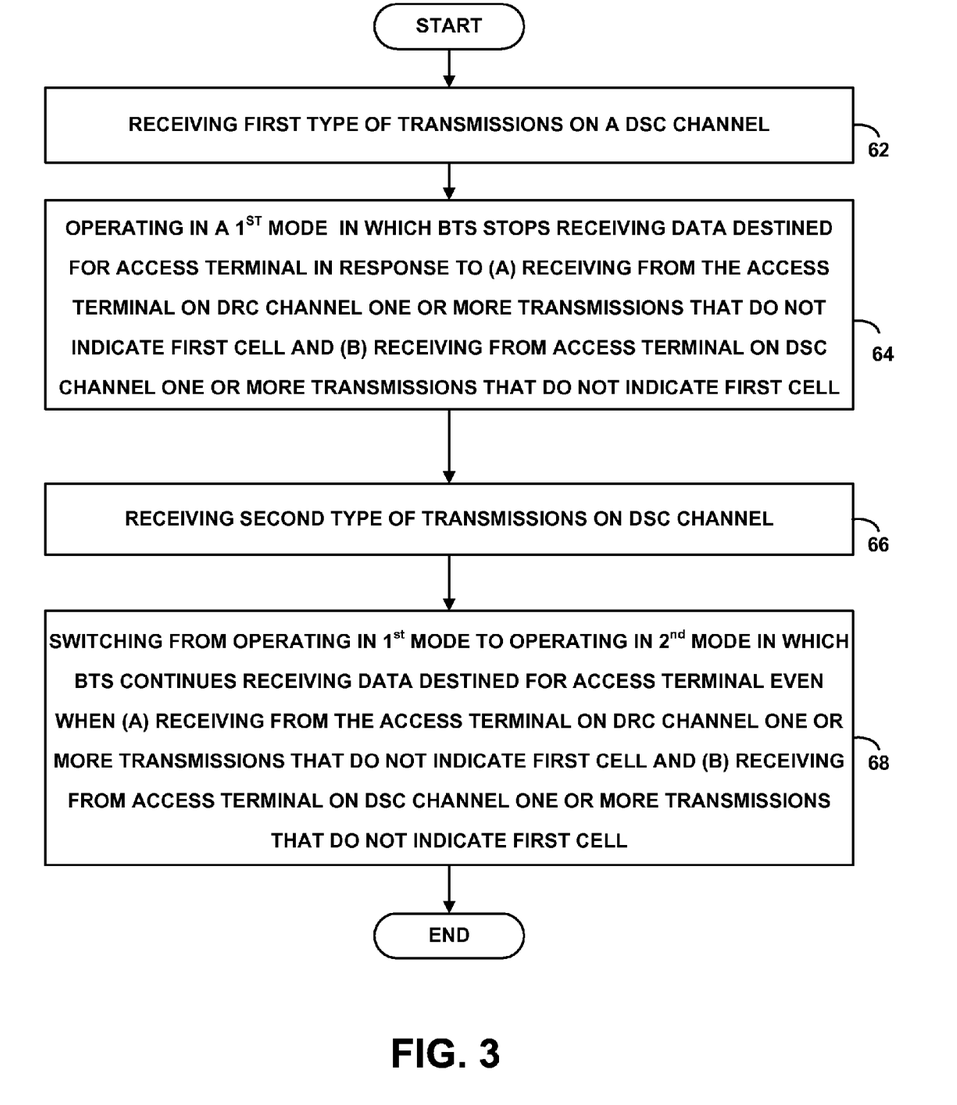
FIG. 3 is a flow chart depicting an exemplary method of operation of a base transceiver station (BTS) in an access network.

FIG. 3 is a flow chart depicting an exemplary method of operation of a BTS 20 of the access network 12, such as the first BTS 20*a*. Throughout this exemplary method, the first BTS 20*a* may be receiving from the access terminal 14, on a first reverse-link channel, transmissions that each indicate a cell of the access network 12 in which the access terminal is currently requesting data. Preferably, the first reverse-link channel will be a DRC channel. In this respect, each transmission on the DRC channel will preferably occupy DRCLength timeslots of the DRC channel and consist of DRCLength consecutive IS-856 DSC messages. In response to receiving on the first reverse-link channel one or more transmissions that indicate the first cell, the first BTS 20*a* may send data to the access terminal in the first cell.

At step 62, the first BTS 20*a* may be receiving from the access terminal 14, on a second reverse-link channel, a first type of transmissions that each occupy a first number of timeslots and that each indicate a cell in which the access terminal will be requesting data after sending the transmission. Preferably, the second reverse-link channel will be a DSC channel. In this respect, the first number will preferably be DSCLength, such that each of the first type of transmissions on the DSC channel occupies DSCLength timeslots of the DSC channel and consists of DSCLength consecutive IS-856 DSC messages.

At step 64, in response to receiving on the second reverse-link channel the first type of transmissions, the first BTS 20*a* may be operating in a first mode. While operating in the first mode, the first BTS 20*a* may stop receiving data destined for the access terminal 14 (e.g., from the RNC 24) in response to (a) receiving from the access terminal 14, on the first reverse-link channel, one or more transmissions that do not indicate the first cell and (b) receiving from the access terminal 14, on the second reverse-link channel, one or more transmissions that do not indicate the first cell. For example, the first BTS 20*a* may stop receiving the data destined for the access terminal 14 by sending a "ForwardStopped" message to the RNC 24.

At step 66, the first BTS 20*a* may receive from the access terminal 14, on the second reverse-link channel, a second type of transmissions that indicate the access terminal is located at the boundary between the first cell and a second cell. In one example, the second type of transmissions may each occupy a second number of timeslots that is less than the first number of timeslots, and the second type of transmissions may each indicate whichever of the first cell and the second cell that a preceding transmission did not indicate. That is, the transmissions may alternate between indicating the first cell and indicating the second cell. As described above, the first number will preferably be DSCLength. The second number will thus preferably be less than DSCLength.

At step 68, in response to receiving on the second reverse-link channel the second type of transmissions, the first BTS 20*a* may switch from operating in the first mode to operating in a second mode. While operating in the second mode, the first BTS 20*a* may continue receiving data destined for the access terminal 14 (e.g., from the RNC 24) even when (a) receiving from the access terminal 14, on the first reverse-link channel, one or more transmissions that do not indicate the first cell and (b) receiving from the access terminal 14, on the second reverse-link channel, one or more transmissions that do not indicate the first cell. For example, the first BTS 20*a* may continue receiving the data destined for the access terminal 14 by suspending the sending of "ForwardStopped" messages to the RNC 24, such that the first BTS 20*a* continues receiving the data destined for the access terminal 14 from the RNC 24.

Figure 4:
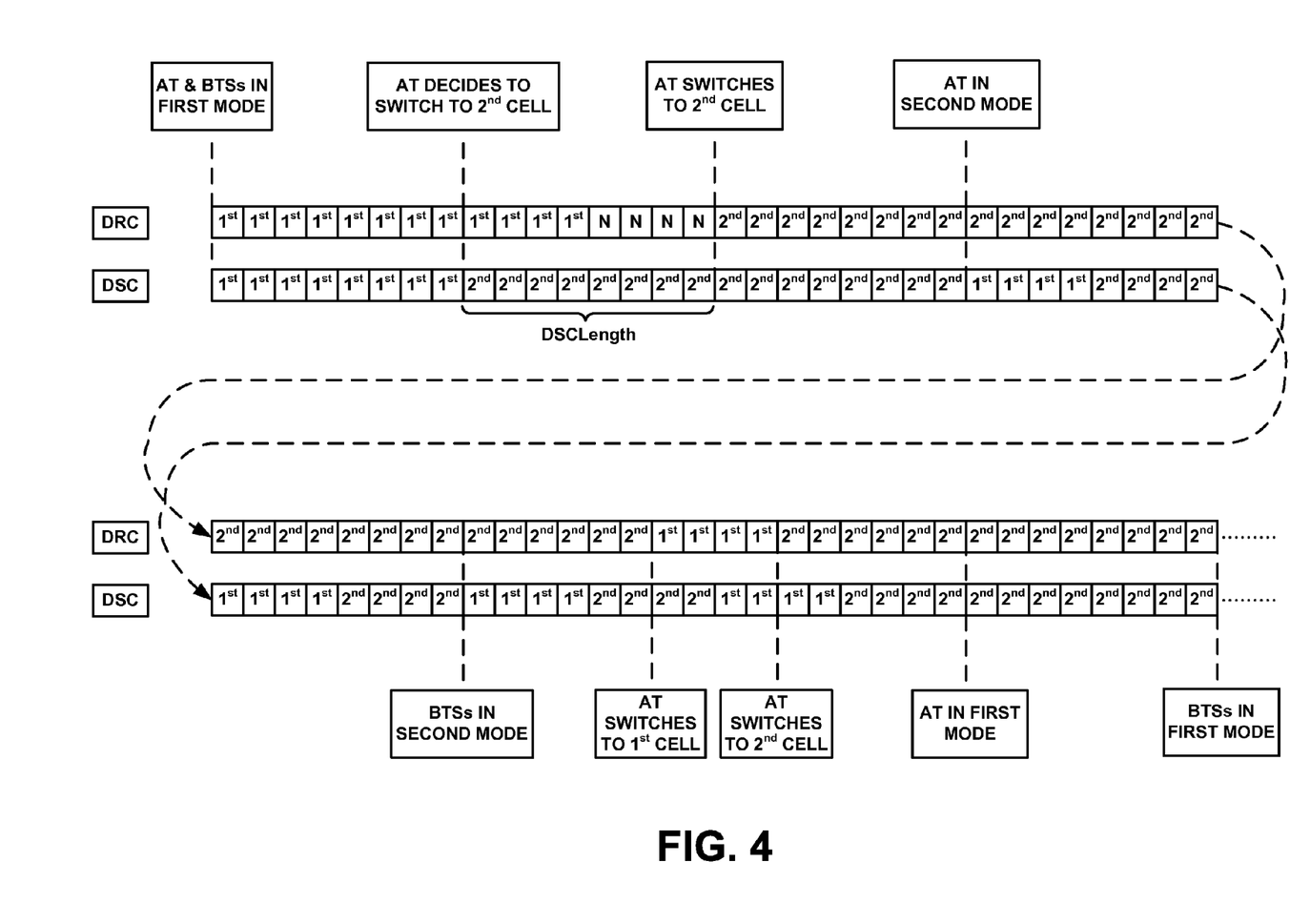
FIG. 4 illustrates an exemplary timeline of the first reverse-link channel and the second reverse-link channel between an access terminal operating according to the exemplary method of FIG. 2 and an access network that includes at least two BTSs operating according to the exemplary method of FIG. 3.

FIG. 4 illustrates an exemplary timeline of the first reverse-link channel and the second reverse-link channel between the access terminal 14 operating according to the method of FIG. 2 and the access network 12, which includes the first BTS 20*a* and the second BTS 20*b* both operating according to the method of FIG. 3. For purposes of illustration, the following description will assume that the first reverse-link channel is a DRC channel and the second reverse-link channel is a DSC channel. Further, for purposes of illustration, the following description will assume that the DRCLength is 2, the DSCLength is 8, the first number is the DSCLength, and the second number is 4. It should be understood, however, that these values are merely examples.

The access terminal 14, the first BTS 20*a*, and the second BTS 20*b* may initially be operating in the first mode. In this respect, both the access terminal 14 and the first BTS 20*a* may be functioning as described above with reference to FIG. 2. More particularly, as shown, the access terminal 14 may be sending one or more DRC-channel transmissions that each indicate the first cell and one or more DSC-channel transmissions that occupy DSCLength timeslots and that each indicate the first cell. In turn, the first BTS 20*a* may be receiving the one or more DRC-channel transmissions and the one or more DSC-channel transmissions. During this time, the first BTS 20*a* may be receiving data destined for the access terminal 14 from the RNC 24 and sending the received data to the access terminal 14, while the second BTS 20*b* may not be receiving data destined for the access terminal 14. In turn, the access terminal 14 may be receiving the data from the first BTS 20*a* in the first cell.

While the access terminal 14, the first BTS 20*a*, and the second BTS 20*b* are operating in the first mode, the access terminal 14 may then decide to switch from requesting data in the first cell to requesting data in the second cell. In response, the access terminal 14 may first send a DSC-channel transmission that occupies DSCLength timeslots and indicates the second cell. In turn, the second BTS 20*b* may begin receiving the DSC-channel transmission that indicates the second cell, and may then responsively request to begin receiving from the RNC 24 data destined for the access terminal 14. For example, the second BTS 20*b* may send the RNC 24 a "ForwardDesired" message. Thereafter, the second BTS 20*b* may begin receiving, and queuing for possible future transmission, the data destined for the access terminal 14.

During at least a portion of the DSC-channel transmission that indicates the second cell, the access terminal 14 may also continue sending, and the first BTS 20*a* may thus continue receiving, the one or more DRC-channel transmissions that indicate the first cell. As such, during this time, the first BTS 20*a* may continue receiving data destined for the access terminal 14 from the RNC 24 and sending the received data to the access terminal 14, and the access terminal 14 may thus continue receiving the data from the first BTS 20*a* in the first cell (albeit at a lower rate than the access terminal 14 could receive data in the second cell). Further, during this time, both the first BTS 20*a* and the second BTS 20*b* may be receiving from the RNC 24 the data destined for the access terminal 14.

During the DSC-channel transmission that indicates the second cell, the access terminal 14 may also switch from sending the one or more DRC-channel transmissions that indicate the first cell to sending one or more DRC-channel transmissions that do not indicate any cell or sector of the access network 12. In this respect, the access terminal 14 may temporarily point its DRC cover to a "null-cover," which is a special DRC cover that does not indicate any cell or sector of the access network 12. For example, as shown, the access terminal 14 may send two DRC-channel transmissions that do not indicate any cell or sector of the access network 12, the first being sent with 2*DRCLength timeslots remaining in the DSC-channel transmission that indicates the second cell. The first BTS 20a may then begin receiving the one or more DRC-channel transmissions that do not indicate the first cell. In response, the first BTS 20a may responsively stop sending data to the access terminal 14 in the first cell. Additionally, because the first BTS 20 is not receiving, on either the DRC channel or the DSC channel, a transmission that indicates the first cell, the first BTS 20a may stop receiving data destined for the access terminal 14. For example, the first BTS 20a may send a "ForwardStopped" message to the RNC 24.

After sending the DSC-channel transmission that indicates the second cell, the access terminal 14 may then begin sending one or more DRC-channel transmissions that indicate the second cell. In turn, the second BTS 20b may begin receiving the one or more DRC-channel transmissions that indicate the second cell. Because the second BTS 20b is already receiving from the RNC 24 data destined for the access terminal 14, the second BTS 20b may then responsively begin sending data to the access terminal 14 in the second cell. As a result, the access terminal 14 may seamlessly begin receiving the data from the second BTS 20b in the second cell.

The access terminal 14, the first BTS 20a, and the second BTS 20b may continue operating in the first mode for some period of time, during which the access terminal 14 may either continue receiving data from the second BTS 20b in the second cell (as shown), or the access terminal 14 may switch to a different cell using the process described above. At some point while operating in the first mode, the access terminal 14 may then detect that it is located at a boundary between the first cell and the second cell. In response, the access terminal 14 may switch from operating in the first mode to operating in the second mode.

In switching to operating in the second mode, the access terminal 14 may first reduce the number of timeslots that each DSC-channel transmission occupies from DSCLength to four timeslots. Thereafter, the access terminal 14 may begin alternating between sending a DSC-channel transmission that indicates the first cell and a DSC-channel transmission that indicates the second cell, with each DSC-channel transmission occupying four timeslots. These second-mode DSC-channel transmissions will preferably serve as a notification to the access network 12 that the access terminal is located at the boundary between the first cell and the second cell.

The first BTS 20a and the second BTS 20b may then both begin receiving these second-mode DSC-channel transmissions from the access terminal 14, with each BTS decoding and processing every other second-mode DSC-channel transmission. After receiving a sufficient number of the second-mode DSC-channel transmissions, the first BTS 20a and the second BTS 20b may then detect that the access terminal 14 is sending a notification that the access terminal 14 is located at the boundary between the first cell and the second cell. For example, as shown, the first BTS 20a and the second BTS 20b may detect that the access terminal 14 is sending the notification after receiving four consecutive second-mode DSC-channel transmissions. Other examples are possible as well, and may depend on the form of the notification.

In response to receiving (and detecting that the access terminal 14 is sending) the second-mode DSC-channel transmissions, the first BTS 20a and the second BTS 20b may both switch from operating in the first mode to operating in the second mode. While operating in the second mode, the first BTS 20a and the second BTS 20b will both preferably receive data destined for the access terminal 14. To facilitate this, the first BTS 20a and the second BTS 20b may first determine whether they are currently receiving data destined for the access terminal, such as by determining whether a last message sent to the RNC 24 for the access terminal's data was a "ForwardDesired" message or a "ForwardStopped" message.

In the example illustrated in FIG. 4, because the second BTS 20b is currently receiving DRC-channel transmissions that indicate the second cell, the second BTS's last message to the RNC 24 will preferably have been a "ForwardDesired" message, and the second BTS 20b will likely be receiving the access terminal's data from the RNC 24. Because the first BTS 20a is not currently receiving DRC-channel transmissions that indicate the first cell, however, the first BTS 20a may not be receiving data destined for the access terminal 14. In this respect, if the first cell was the one indicated by the DSC-channel transmission being received when the first BTS 20a recognized the notification, then the first BTS's last message to the RNC 24 will preferably have been a "ForwardDesired" message, and the first BTS 20a will likely be receiving the access terminal's data from the RNC 24. Alternatively, if the first cell was not the one indicated by the DSC-channel transmission being received when the first BTS recognized the notification, then the first BTS's last message to the RNC 24 will preferably have been a "ForwardStopped" message, and the first BTS 20a will likely not be receiving the access terminal's data from the RNC 24.

If the first BTS 20a determines that it is not currently receiving data destined for the access terminal 14, the first BTS 20a may then request to begin receiving data destined for the access terminal 14. For example, the first BTS 20a may send a "ForwardDesired" message for the access terminal's data to the RNC 24, and as a result the first BTS 20a may begin receiving the access terminal's data from the RNC 24. Thereafter, while operating in the second mode, the first BTS 20a and the second BTS 20b may function such that they continuously receive data destined for the access terminal 14. In this respect, while operating in the second mode, both the first BTS 20a and the second BTS 20b will preferably suspend transmission of "ForwardStopped" messages to the RNC 24.

While the access terminal 14, the first BTS 20a, and the second 20b are operating in the second mode, the access terminal 14 will preferably be capable of switching between requesting data in the first cell and requesting data in the second cell, without first providing the access network 12 with advance notification of the access terminal's decision to switch to a different cell. In turn, the access network 12 will preferably be capable of sending data to the access terminal 14 in either first cell or the second cell almost immediately upon request by the access terminal 14. For example, while operating in the second mode, the access terminal 14 may decide to switch from requesting data in the second cell to requesting data in the first cell. In response, and without first sending a DSC-channel transmission that indicates the first cell, the access terminal 14 may then begin sending one or more DRC-channel transmissions that indicate the first cell. In turn, the first BTS 20a may begin receiving the one or more DRC-channel transmissions that indicate the first cell. Because the first BTS 20a is operating in the second mode and is thus already receiving data destined for the access terminal 14, the first BTS 20a may then responsively begin sending the data to the access terminal 14 in the first cell. As a result, the access terminal 14 may begin receiving the data from the first BTS 20*a* in the first cell. As shown, the access terminal 14 may also switch from requesting data in the first cell to requesting data in the second cell in a similar manner.

The access terminal 14, the first BTS 20*a*, and the second 20*b* may continue operating in the second mode as long as the access terminal 14 is located at the boundary between the first cell and the second cell. After some period of time, the access terminal 14 may then detect that it is no longer located at the boundary between the first and second cells. For example, the access terminal 14 may detect that it is no longer located at the boundary between the first and second cells using the exemplary techniques described above. In turn, the access terminal 14 may switch from operating in the second mode back to operating in the first mode. Upon switching back to operating the first mode, the access terminal 14 may first increase the number of timeslots that each DSC-channel transmission occupies from four timeslots back to DSCLength. Thereafter, the access terminal 14 may stop alternating between sending a DSC-channel transmission that indicates the first cell and a DSC-channel transmission that indicates the second cell, and instead begin sending first-mode DSC-channel transmissions that each occupy DSCLength timeslots and that each indicate a cell in which the access terminal 14 will be requesting data after the transmission.

The first BTS 20*a* and the second BTS 20*b* may then both begin receiving these first-mode DSC-channel transmissions from the access terminal 14. After receiving a sufficient number of the first-mode DSC-channel transmissions, the first BTS 20*a* and the second BTS 20*b* may then detect that the access terminal 14 has stopped sending the notification that the access terminal 14 is located at the boundary between the first cell and the second cell. For example, as shown, the first BTS 20*a* and the second BTS 20*b* may detect that the access terminal 14 is no longer sending the notification after receiving one first-mode DSC-channel transmission. Other examples are possible as well.

In response to receiving (and detecting that the access terminal 14 is sending) the first-mode DSC-channel transmissions, the first BTS 20*a* and the second BTS 20*b* may switch from operating in the second mode back to operating in the first mode. While operating in the first mode, the first BTS 20*a* and the second BTS 20*b* may no longer both be continuously receiving data destined for the access terminal 14. In this respect, the first BTS 20*a* and the second BTS 20*b* will preferably reinstate transmission of "ForwardStopped" messages to the RNC 24, such that those BTSs can request the RNC 24 to stop sending the access terminal's data when that data is not needed. For example, if neither the DRC-channel transmissions nor the DSC-channel transmissions being received by the first BTS 20*a* indicate the first cell, the first BTS 20*a* may request the RNC 24 to stop sending it the access terminal's data, such as by sending the RNC 24 a "ForwardStopped" message. Similarly, if neither the DRC-channel transmissions nor the DSC-channel transmissions being received by the second BTS 20*b* indicate the second cell, the second BTS 20*b* may request the RNC 24 to stop sending it the access terminal's data, such as by sending the RNC 24 a "ForwardStopped" message.

Advantageously, the exemplary methods described herein may improve an overall rate at which the access terminal 14 receives data from the access network 12 while the access terminal 14 is located at a boundary between two cells of the access network 12. For example, while the access terminal is located at a boundary between two cells, the access terminal 14 may no longer have to wait a predefined number of timeslots (e.g., DSCLength) before switching between those cells, and may instead switch to, and receive almost immediate data in, either cell. In this respect, the access terminal 14 may then be able to seamlessly switch between the cells, and thus selectively receive data from whichever cell is capable of providing a higher data rate. As another example, while the access terminal is located at a boundary between two cells, the access terminal 14 may no longer be required to send DRC messages with null-covers to the access network 12 before switching between the cells, thus enabling the access network 12 to serve to the access terminal 14 more continuously while the access terminal is switching between the cells at the boundary.

It should also be understood that the exemplary methods described herein may be applied when the access terminal 14 is located at a boundary between more than two coverage areas. In this respect, using the methods described above, the access terminal 14 may use the second reverse-link channel to notify the access network 12 that the access terminal 14 is located at the boundary between three or more cells, and the access network 12 may then prepare to serve the access terminal 14 in those three or more cells.

Figure 5:
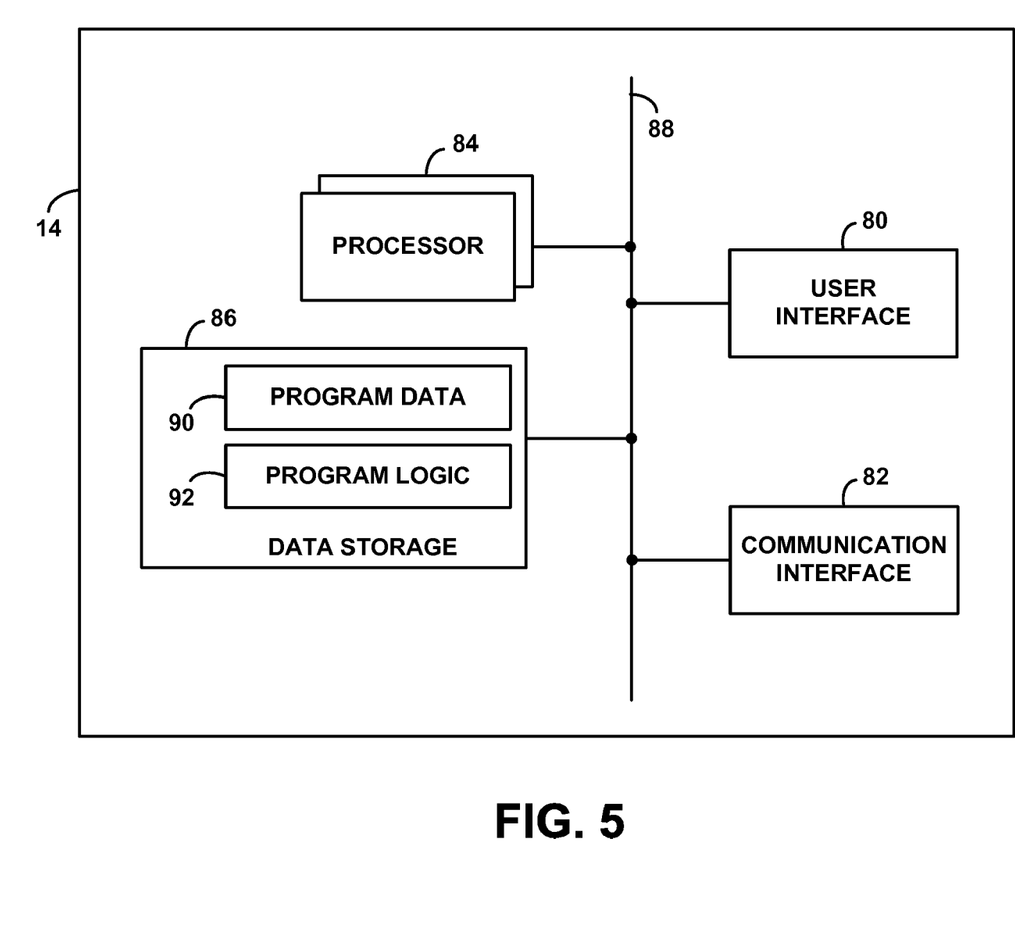
FIG. 5 is a simplified block diagram showing functional components of an exemplary access terminal capable of carrying out the exemplary method of FIG. 2.

FIG. 5 is a simplified block diagram showing functional components of an exemplary access terminal 14 capable of carrying out the exemplary method of FIG. 2. As shown in FIG. 5, the exemplary access terminal 14 may include a user interface 80, a communication interface 82, a processor 84, and data storage 86, all linked together via a system bus, network, or other connection mechanism 88.

Referring to FIG. 5, the user interface 80 preferably functions to facilitate user interaction with the exemplary access terminal 14. The user interface 80 may include a variety of input components, such as a touch screen, a navigation pad, a multi-functional button, a thumb wheel, a keyboard or keypad, and/or a microphone for instance. Additionally, the user interface 80 may include a variety of output components, such as a display screen and/or a speaker for instance. Additionally yet, the user interface 80 may include signal processing components, such as A-D and D-A circuitry. The user interface 80 may include other components for facilitating user interaction with the exemplary access terminal 14 as well.

The communication interface 82 preferably functions to communicatively couple the exemplary access terminal 14 to the access network 12, and more particularly the BTSs 20 of the access network 12. In this respect, the communication interface 82 will preferably facilitate forward-link and reverse-link communication with the access network 12. Further, the communication interface 82 will preferably support multiple channels on the forward-link and reverse-link, including a first reverse-link channel (e.g., a DRC channel) and a second-reverse link channel (e.g., a DSC channel).

The communication interface 82 may take the form of an Ethernet network interface module, a chipset and antenna adapted to facilitate wireless communication according a desired protocol (e.g., IS-856), and/or any other form that provides for wireless and/or wired communication. The communication interface 82 may also include multiple communication interfaces, such as one with which the exemplary access terminal 14 sends reverse-link communications and one with which the exemplary access terminal 14 receives forward-link communications. Other configurations are also possible.

The processor 84 may comprise one or more general purpose microprocessors and/or dedicated signal processors. (The term "processor" encompasses either a single processor or multiple processors that could work in combination.) Data storage 86, in turn, may comprise memory and/or other storage components, such as optical, magnetic, organic or other memory or disk/disc storage, which can be volatile and/or non-volatile, internal and/or external, and integrated in whole or in part with the processor 84. Data storage 86 preferably contains or is arranged to contain (i) program data 90 and (ii) program logic 92. Although these components are described herein as separate data storage elements, the elements could just as well be physically integrated together or distributed in various other ways. In a preferred example, the program data 90 would be maintained in data storage 86 separate from the program logic 92, for easy updating and reference by the program logic 92.

Program data 90 may contain information related to the first and second reverse-link channels. For example, program data 90 may contain an indication of a cell (and more particularly a sector) in which the exemplary access terminal 14 is currently requesting data (e.g., a DRC cover), which the exemplary access terminal 14 may send via the first reverse-link channel. As another example, program data 90 may contain an indication of a cell in which the exemplary access terminal 14 will be requesting data in the near future (e.g., a DSC cover), which the exemplary access terminal 14 may send via the second reverse-link channel. As yet another example, program data 90 may contain an indication of a number of timeslots that transmissions on the first reverse-link channel and/or the second reverse-link channel occupy. In this respect, program data 90 will preferably contain an indication of both the first number of timeslots and the second number of timeslots for transmissions on the second reverse-link channel.

Program data 90 may also contain information related to the sectors and/or cells in which the exemplary access terminal 14 has previously requested data. For example, program data 90 may contain an identifier of each sector and/or cell in which the exemplary access terminal 14 has recently requested data. As another example, program data 90 may contain an indication of a time period during which the exemplary access terminal 14 was requesting data in each recent sector and/or cell. Other examples are possible as well.

Program data 90 may additionally contain information related to the sectors and/or cells detected by the exemplary access terminal 14. For example, program data 90 may contain identifiers of the sectors and/or cells detected by the exemplary access terminal 14. As another example, program data 90 may contain one or more signal conditions (e.g., SINR, C/I, etc.) of the sectors and/or cells detected by the exemplary access terminal 14. As yet another example, program data 90 may contain data defining boundaries of the sectors and/or cells detected by the exemplary access terminal 14. Other examples are possible as well.

Program logic 92 preferably comprises machine-language instructions that may be executed or interpreted by processor 84 to carry out functions in accordance with the exemplary method described in FIG. 2. It should be understood, however, that the program logic 92 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 92 may be executable by the processor 84 to (a) to the access network 12, on a first reverse-link channel (e.g., a DRC channel), transmissions that each indicate a cell in which the exemplary access terminal 14 is currently requesting data and (b) receive data from the access network 12 in a given cell as a result of sending on the first reverse-link channel one or more transmissions that indicate the given cell. As another example, the program logic 92 may be executable by the processor 84 to enable the exemplary access terminal 14 to operate in two modes, in accordance with the exemplary method described above. In this respect, the program logic 92 may be executable by the processor 84 to cause the exemplary access terminal 14 to (a) operate in a first mode, (b) detect that it is located at a boundary between a first cell and a second cell of the access network 12, and (c) switch from operating in the first mode to operating in a second mode.

While the exemplary access terminal 14 is operating in the first mode, the program logic 92 may be executable by the processor 84 to cause the exemplary access terminal 14 to send to the access network 12, on a second reverse-link channel (e.g., a DSC channel), transmissions that each occupy a first number of timeslots and that each indicate a cell in which the exemplary access terminal 12 will be requesting data after sending the transmission.

In switching from operating in the first mode to operating in the second mode, the program logic 92 may then be executable by the processor 84 to cause the exemplary access terminal 14 to reduce a number of timeslots that each transmission on the second reverse-link channel occupies from the first number to a second number, and begin alternating between sending to the access network 12 on the second reverse-link channel a transmission that indicates the first cell and sending to the access network 12 on the second reverse-link channel a transmission that indicates the second cell, with each transmission occupying the second number of timeslots. Other examples are possible as well.

Figure 6:
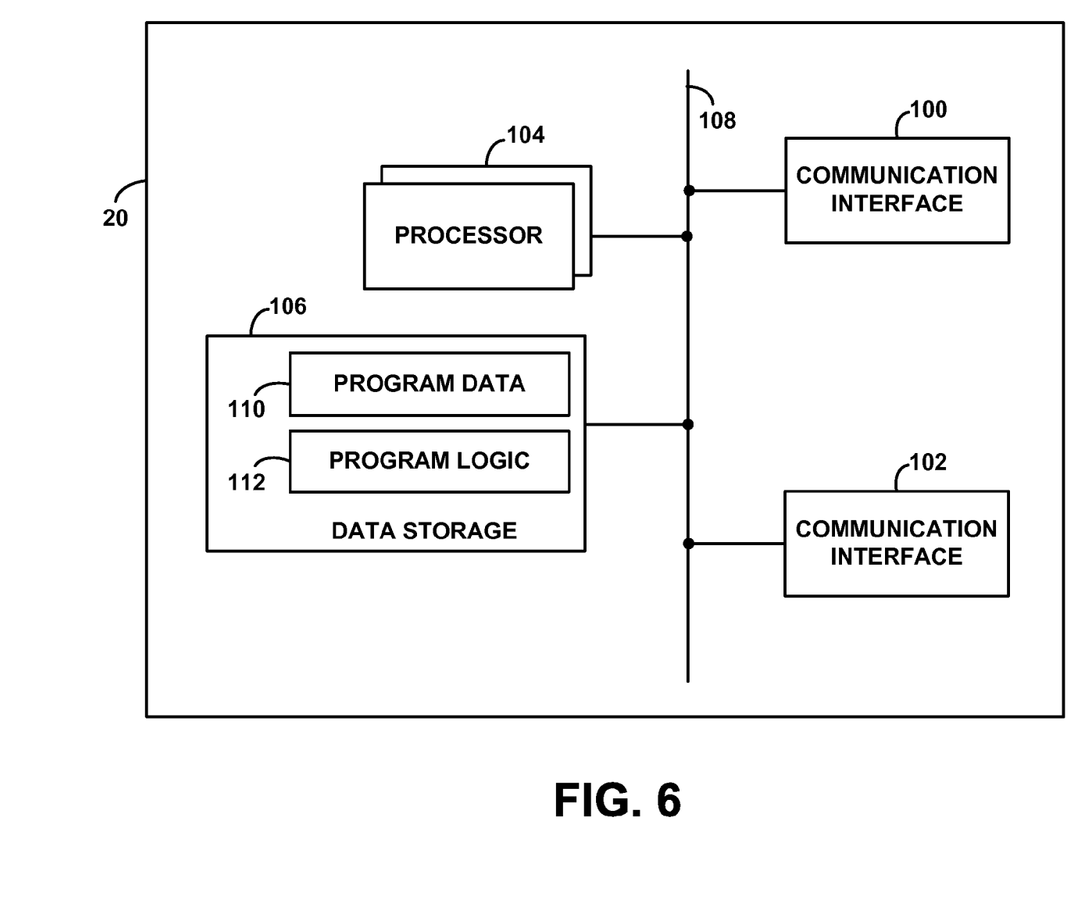
FIG. 6 is a simplified block diagram showing functional components of an exemplary BTS capable of carrying out the exemplary method of FIG. 3.

FIG. 6 is a simplified block diagram showing functional components of an exemplary BTS 20 capable of carrying out the exemplary method of FIG. 3. As shown in FIG. 6, the exemplary BTS 20 may include an antenna structure 100, a communication interface 102, a processor 104, and data storage 106, all linked together via a system bus, network, or other connection mechanism 108.

Referring to FIG. 6, the antenna structure 100 may function to transmit one or more RF-radiation patterns that provide one or more air interfaces 22 over which the access terminal 14 (and perhaps other entities) may communicate wirelessly with the exemplary BTS 20, and thus the access network 12. The exemplary BTS's one or more air interfaces 22 may define at least a first cell in which the exemplary BTS 20 is capable of serving the access terminal 14. Preferably, the antenna structure 100 will facilitate both forward-link and reverse-link communication with the access terminal 14. Further, the antenna structure 100 will preferably support multiple channels on the forward-link and reverse-link, including a first reverse-link channel (e.g., a DRC channel) and a second-reverse link channel (e.g., a DSC channel).

The antenna structure 100 may be arranged in various ways. For example, the antenna structure 100 may include one or more antennas. In one respect, the one or more antennas may include one or more omni-directional antennas and/or one or more directional (e.g., sectored) antennas. In another respect, the one or more antennas may include one or more antennas for receiving RF signals and one or more antennas for transmitting RF signals away from the antenna structure 100. Other configurations are also possible.

The communication interface 102 preferably functions to communicatively couple the exemplary BTS 20 to the RNC 24 (and perhaps other entities). As such, the communication interface 102 may take the form of an Ethernet network interface card, a chipset and antenna adapted to facilitate wireless communication according a desired protocol, and/or any other form that provides for wired and/or wireless communication with the RNC 24. Preferably, the communication interface 102 will be a T1/E1 interface. The communication interface 102 may also include multiple communication interfaces, such as one through which the exemplary BTS 20 sends data to the RNC 24 and one through which the exemplary BTS 20 receives data from the RNC 24. Other configurations are also possible.

The processor 104 may comprise one or more general purpose microprocessors and/or dedicated signal processors. (The term "processor" encompasses either a single processor or multiple processors that could work in combination.) Data storage 106, in turn, may comprise memory and/or other storage components, such as optical, magnetic, organic or other memory or disk/disc storage, which can be volatile and/or non-volatile, internal and/or external, and integrated in whole or in part with the processor 104. Data storage 106 preferably contains or is arranged to contain (i) program data 110 and (ii) program logic 112. Although these components are described herein as separate data storage elements, the elements could just as well be physically integrated together or distributed in various other ways. In a preferred example, the program data 110 would be maintained in data storage 106 separate from the program logic 112, for easy updating and reference by the program logic 112.

Program data 110 may contain information related to the coverage areas of the exemplary BTS 20. For example, program data 110 may contain an identifier of a cell and/or sectors served by the exemplary BTS 20. As another example, program data 110 may contain one or more signal conditions (e.g., SINR, C/I, etc.) of a cell and/or sectors served by the exemplary BTS 20. As yet another example, program data 110 may contain data defining boundaries of a cell and/or sectors served by the exemplary BTS 20. Other examples are possible as well.

Program data 110 may also contain information related to access terminals 14 within range of the exemplary BTS 20. For example, program data 110 may contain an identifier of one or more access terminals 14 within range of the exemplary BTS 20. As another example, program data 110 may contain, for one or more access terminals 14 within range of the exemplary BTS 20, an indication of a cell (and more particularly a sector) in which the access terminal 14 is currently requesting data (e.g., a DRC cover), which the exemplary BTS 20 may receive via a first reverse-link channel. As yet another example, for one or more access terminals 14 within range of the exemplary BTS 20, program data 110 may contain an indication of a cell in which the access terminal 14 will be requesting data in the near future (e.g., a DSC cover), which the exemplary BTS 20 may receive via a second reverse-link channel. As still another example, program data 110 may contain data destined for one or more access terminals 14 within range of the exemplary BTS 20, which the exemplary BTS 20 may receive from the RNC 24. Program data 110 may contain other types of data as well.

Program logic 112 preferably comprises machine-language instructions that may be executed or interpreted by processor 104 to carry out functions in accordance with the exemplary method described in FIG. 3. It should be understood, however, that the program logic 112 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 112 may be executable by the processor 104 to (a) receive from the access terminal 14, on a first reverse-link channel, transmissions that each indicate a cell of the access network 12 in which the access terminal is currently requesting data and (b) send data to the access terminal 14 in the first cell in response to receiving on the first reverse-link channel one or more transmissions that indicate the first cell. As another example, the program logic 112 may be executable by the processor 104 to enable the exemplary BTS 20 to operate in two modes, in accordance with the exemplary method described above. In this respect, the program logic 112 may be executable by the processor 104 to cause the exemplary BTS 20 to (a) operate in a first mode in response to receiving from the access terminal 14, on a second reverse-link channel, a first type of transmissions that each occupy a first number of timeslots and that each indicate a cell in which the access terminal will be requesting data after sending the transmission and (b) switch from operating in the first mode to operating in a second mode in response to receiving from the access terminal 14, on the second reverse-link channel, a second type of transmissions that indicate the access terminal is located at the boundary between the first cell and a second cell.

While operating in the first mode, the program logic 112 may be executable by the processor 104 to cause the exemplary BTS 20 to stop receiving data destined for the access terminal 14 (e.g., from the RNC 24) in response to (a) receiving from the access terminal 14, on the first reverse-link channel, one or more transmissions that do not indicate the first cell and (b) receiving from the access terminal 14, on the second reverse-link channel, one or more transmissions that do not indicate the first cell. For example, the program logic 112 may be executable by the processor 104 to send a "ForwardStopped" message to the RNC 24.

While operating in the second mode, the program logic 112 may then be executable by the processor 104 to cause the exemplary BTS 20 to continue receiving data destined for the access terminal 14 (e.g., from the RNC 24) even when (a) receiving from the access terminal 14, on the first reverse-link channel, one or more transmissions that do not indicate the first cell and (b) receiving from the access terminal 14, on the second reverse-link channel, one or more transmissions that do not indicate the first cell. For example, the program logic 112 may be executable by the processor 104 to suspend the sending of "ForwardStopped" messages to the RNC 24, such that the exemplary BTS 20 continues receiving the data destined for the access terminal 14 from the RNC 24. Other examples are possible as well.

Exemplary embodiments have been described above. Those skilled in the art will understand, however, that changes and modifications may be made to the embodiments described without departing from the true scope and spirit of the present invention, which is defined by the claims.

We claim:

1. A method of operation of an access terminal in an access network, the method comprising:
sending to the access network, on a first reverse-link channel, transmissions for indicating a coverage area of the access network in which the access terminal is currently requesting data;
operating in a first mode in which the access terminal sends to the access network, on a second reverse-link channel, a first type of transmissions for indicating a coverage area of the access network in which the access terminal will be requesting data wherein the transmissions of the first type each occupies a first number of timeslots and each indicates a coverage area in which the access terminal will be requesting data after sending the transmission;

detecting that the access terminal is located at a boundary between a first coverage area and a second coverage area;

in response to detecting that the access terminal is located at the boundary, the access terminal switching from operating in the first mode to operating in a second mode in which the access terminal sends to the access network, on the second reverse-link channel, a second type of transmissions for indicating that the access terminal is located at the boundary between the first coverage area and the second coverage area, wherein the transmissions of the second type each occupies a reduced second number of timeslots and alternate between a transmission that indicates the first coverage area and a transmission that indicates the second coverage area; and while operating in the second mode, the access terminal sending the second type of transmissions.

2. The method of claim 1, further comprising:

while operating in the first mode, the access terminal (a) sending on the first reverse-link channel one or more transmissions each indicating the first coverage area, (b) deciding to switch from requesting data in the first coverage area to requesting data in the second coverage area, (c) in response to deciding to switch, first sending on the second reverse-link channel a transmission that indicates the second coverage area, and (d) after sending on the second reverse-link channel the transmission that indicates the second coverage area, sending on the first reverse-link channel one or more transmissions each indicating the second coverage area; and while operating in the second mode, the access terminal (a) sending on the first reverse-link channel one or more transmissions each indicating the first coverage area, (b) deciding to switch from requesting data in the first coverage area to requesting data in the second coverage area, and (c) in response to deciding to switch and without first sending on the second reverse-link channel a transmission that indicates the second coverage area, sending on the first reverse-link channel one or more transmissions each indicating the second coverage area.

3. The method of claim 2, further comprising:

while operating in the first mode and sending on the second reverse-link channel the transmission that indicates the second coverage area, the access terminal sending on the first reverse-link channel at least one transmission that indicates no coverage area before sending on the first reverse-link channel the one or more transmissions each indicating the second coverage area; and while operating in the second mode and without first sending a transmission on the first reverse-link channel that indicates no coverage area, the access terminal sending on the first reverse-link channel the one or more transmissions each indicating the second coverage area.

4. The method of claim 1, further comprising:

as a result of sending on the first reverse-link channel one or more transmissions each indicating a given coverage area, the access terminal receiving data from the access network in the given coverage area.

5. The method of claim 1, wherein the first reverse-link channel comprises a data rate control (DRC) channel, and the second reverse-link channel comprises a data source control (DSC) channel.

6. The method of claim 5, wherein each transmission on the DRC channel consists of a plurality of consecutive IS-856 DSC messages, each occupying one timeslot of the DRC channel, and wherein each transmission on the DSC channel consists of a plurality of consecutive IS-856 DSC messages, each occupying one timeslot of the DSC channel.

7. The method of claim 1, wherein the first number is DSCLength.

8. The method of claim 1, wherein the second number is four.

9. The method of claim 1, wherein detecting that the access terminal is at the boundary between the first coverage area and the second coverage area comprises:

determining that the access terminal has switched between requesting data in the first coverage area and requesting data in the second coverage a threshold number of times during a given time period.

10. The method of claim 1, wherein detecting that the access terminal is at the boundary between the first coverage area and the second coverage area comprises:

determining a given signal condition of both the first coverage area and the second coverage area; and determining that a difference between the given signal condition of the first coverage area and the given signal condition of the second coverage area is less than a predefined threshold.

11. The method of claim 1, wherein detecting that the access terminal is at the boundary between the first coverage area and the second coverage area comprises:

determining that a location of the access terminal is less than a predefined distance from a location of the boundary between the first coverage area and the second coverage area.

12. A method of operation of an access network that includes a first base transceiver station (BTS), the method comprising:

receiving from the access terminal, on a first reverse-link channel of the first BTS, transmissions for indicating a coverage area of the access network in which the access terminal is currently requesting data;

receiving from the access terminal, on a second reverse-link channel of the first BTS, a first type of transmissions for indicating a coverage area of the access network in which the access terminal will be requesting data, wherein the transmissions of the first type each occupies a first number of timeslots and each indicate a coverage area in which the access terminal will be requesting data after sending the transmission;

while receiving the first type of transmissions on the second reverse-link channel of the first BTS, operating in a first mode in which the access network (1) provides data destined for the access terminal to the first BTS in response to receiving from the access terminal, on at least one of the first and second reverse-link channels of the first BTS, one or more transmissions each indicating the first coverage area and (2) ceases to provide data destined for the access terminal to the first BTS in response to (a) receiving from the access terminal, on the first reverse-link channel of the first BTS, one or more transmissions each not indicating the first coverage area and (b) receiving from the access terminal, on the second reverse-link channel of the first BTS, one or more transmissions each not indicating the first coverage area;

receiving from the access terminal, on the second reverse-link channel of the first BTS, a second type of transmissions for indicating that the access terminal is located at a boundary between the first coverage area and a second coverage area, wherein the transmissions of the second type each occupies a reduced second number of timeslots and alternate between a transmission that indicates the first coverage area and a transmission that indicates the second coverage area; and in response to receiving the second type of transmissions on the second reverse-link channel of the first BTS, switching from operating in the first mode to operating in a second mode in which the access network continues to provide data destined for the access terminal to the first BTS even in response to (a) receiving from the access terminal, on the first reverse-link channel of the first BTS, one or more transmissions each not indicating the first coverage area and (b) receiving from the access terminal, on the second reverse-link channel of the first BTS, one or more transmissions each not indicating the first coverage area.

13. The method of claim 12, further comprising:

receiving from the access terminal, on the first reverse-link channel of the first BTS, one or more transmissions each indicating the first coverage area; and in response to receiving, on the first reverse-link channel of the first BTS, the one or more transmissions each indicating the first coverage area, sending the data destined for the access terminal from the first BTS to the access terminal.

14. The method of claim 12, wherein providing the data destined for the access terminal to the first BTS comprises sending the data destined for the access terminal from a radio network controller (RNC) to the first BTS.

15. The method of claim 14, wherein:

while operating in the first mode, the access network ceasing to provide data destined for the access terminal to the first BTS comprises the first BTS sending a "ForwardStopped" message to the RNC; and while operating in the second mode, the access network continuing to provide data destined for the access terminal to the first BTS comprises the first BTS suspending the sending of "ForwardStopped" messages to the RNC.

16. The method of claim 12, further comprising:

while operating in the first mode, the access terminal (a) receiving, on the first reverse-link channel of the first BTS, one or more transmissions each not indicating the first coverage area, (b) while receiving, on the first reverse-link channel of the first BTS, the one or more transmissions each not indicating the first coverage area, receiving, on the second reverse-link channel of the first BTS, a first transmission that indicates the first coverage area, and (c) after receiving, on the second reverse-link channel of the first BTS, the first transmission that indicates the first coverage area, receiving, on the first reverse-link channel of the first BTS, a first transmission that indicates the first coverage area; and while operating in the second mode, the access terminal (a) receiving, on the first reverse-link channel of the first BTS, one or more transmissions each not indicating the first coverage area, and (b) without first receiving, on the second reverse-link channel of the first BTS, a transmission that indicates the first coverage area, receiving, on the first reverse-link channel of the first BTS, a first transmission that indicates the first coverage area.

17. An access terminal comprising:

a communication interface for communicating with an access network;

a processor;

data storage; and program instructions stored in the data storage and executable by the processor for:

sending to the access network via the communication interface, on a first reverse-link channel, transmissions each for indicating a coverage area of the access network in which the access terminal is currently requesting data;

operating in a first mode in which the access terminal sends to the access network via the communication interface, on a second reverse-link channel, a first type of transmissions for indicating a coverage area of the access network in which the access terminal will be requesting data wherein the transmissions of the first type each occupies a first number of timeslots and each indicates a coverage area in which the access terminal will be requesting data after sending the transmission;

detecting that the access terminal is located at a boundary between a first coverage area and a second coverage area; and in response to detecting that the access terminal is located at the boundary, the access terminal switching from operating in the first mode to operating in a second mode in which the access terminal sends to the access network via the communication interface, on the second reverse-link channel, a second type of transmissions for indicating that the access terminal is located at the boundary between the first coverage area and the second coverage area, wherein the transmissions of the second type each occupies a reduced second number of timeslots and alternate between a transmission that indicates the first coverage area and a transmission that indicates the second coverage area; and while operating in the second mode, sending the second type of transmissions via the communication interface.

18. The access terminal of claim 17, wherein the first reverse-link channel comprises a data rate control (DRC) channel, and the second reverse-link channel comprises a data source control (DSC) channel.

* * * * *